United States Patent [19]

Kim et al.

[11] Patent Number: 6,118,543

[45] Date of Patent: Sep. 12, 2000

[54] AUTOMATICALLY PRINTING OR STORING DOCUMENT FORMS BASED ON PRESENSE OF IDENTIFICATION NUMBER IN THE INPUT DATA STREAM

[75] Inventors: In-Koo Kim, Incheon-si; Sung-Jae Kim, Sungnam-si, both of Rep. of Korea

[73] Assignee: SamSung Electronics Co., Ltd., Suwon, Rep. of Korea

[21] Appl. No.: 08/910,427

[22] Filed: Aug. 13, 1997

[30] Foreign Application Priority Data

Aug. 13, 1996 [KR] Rep. of Korea .................... 96 33582

[51] Int. Cl.[7] .............................. B41B 15/00; B41J 15/00; G06F 15/00
[52] U.S. Cl. ........................................... 358/1.15
[58] Field of Search .......................... 395/115–117, 824, 395/825, 827, 840; 707/500, 502, 513, 522, 530; 358/403, 1.15, 1.16; 382/305, 306

[56] References Cited

U.S. PATENT DOCUMENTS

| | | | |
|---|---|---|---|
| 4,416,375 | 11/1983 | Braverman et al. ................ | 206/531.1 |
| 5,060,980 | 10/1991 | Johnson et al. ...................... | 283/115 |
| 5,067,024 | 11/1991 | Anzai ................................... | 358/296 |
| 5,319,790 | 6/1994 | Kumagai ............................. | 395/800 |
| 5,478,155 | 12/1995 | Sasaki ................................. | 400/76 |
| 5,561,528 | 10/1996 | Johnson et al. ...................... | 358/296 |

*Primary Examiner*—Joseph Mancuso
*Assistant Examiner*—F. E. Cooperrider
*Attorney, Agent, or Firm*—Robert E. Bushnell, Esq.

[57] ABSTRACT

A system of automatically printing a form, having a central processing unit; a read only memory; a communication port for receiving data for a form to be printed, from a host computer; a random access memory for storing the data; a motor driving part; and a head driving part for controlling a printer head, includes a read only memory writer for storing a form in response to a command from the central processing unit. A method of automatically printing a form includes the steps of receiving data for a form to be printed, from a host computer through a communication port; determining if the input data includes a command to print the form; if the input data includes the command, reading out an identification number (ID) corresponding to the form; determining the ID corresponds to a stored ID; if a corresponding stored ID exist; printing out the form; and if there is no corresponding stored ID storing the input data for the form after assigning an identification number.

4 Claims, 3 Drawing Sheets

AUTOMATICALLY PRINTING OR STORING DOCUMENT FORMS BASED ON PRESENSE OF IDENTIFICATION NUMBER IN THE INPUT DATA STREAM

CLAIM OF PRIORITY

This application makes reference to, incorporates the same herein, and claims all benefits accruing under 35 U.S.C. §119 from an application for System and Method of Automatically Printing Document Form earlier filed in the Korean Industrial Property Office on Aug. 13, 1996 and there duly assigned Ser. No. 33582/1996.

FIELD OF THE INVENTION

The present invention relates to a system of automatically printing a document form. More particularly, it relates to a system of automatically printing out a frequently used document form which is stored in a non-volatile memory device of the system in response to the input of a command to print, and further relates to a method thereof.

DISCUSSION OF RELATED ART

In former days, we had used standard forms such as a company blank form that were made in advance by a print shop. Users had to order printing offices to make document forms beforehand, and the document forms, manufactured in this way, have a disadvantageous cost aspect.

For this reason, users recently have developed computer programs of fixed formats and made desired forms on ordinary paper using the computer program, which takes much time and effort. In addition, whenever a user needs a certain document form, he or she has the trouble to work on his or her computer to make data for that form, and to print out the data using a printer. U.S. Pat. No. 5,561,528 for Forms on Demand Printing to Johnson et al discloses a printer that prints a variety of forms. However, the forms do not print automatically, as the user must push certain buttons in order to print any forms.

SUMMARY OF THE INVENTION

Accordingly, an object of the present invention is to allow a user to automatically be able to print a variety of forms.

It is also an object of the present invention to use a host computer to download the information as to which form to print.

It is also an object of the present invention to provide a system and a method of storing a frequently used document form in a non-volatile memory and automatically printing the form without remaking data for that form with a computer.

To achieve these and other advantages and in accordance with the purpose of the present invention, as embodied and broadly described, the present invention provides a system for automatically printing a form, having a central processing unit for controlling the overall operation of the system; a read only memory for storing various control programs and initialization data to be provided to the central processing unit; a communication port for receiving data for printing a form to be printed from a host computer; a random access memory storing the data for printing the form output from the host computer through the communication port; a motor driving part for driving a paper feeding/paper output/ motor; and a head driving part for controlling a printer head, the system including a read only memory writer for storing a form in response to a command from the central processing unit.

According to another aspect of the present invention, a method of automatically printing a form, includes the steps of: receiving data for printing a form to be printed from a host computer through a communication port; determining if the input data includes a command to print the form; if the input data includes the print command, determining if the input data contains an identification number for the form; if the input stream contains a form indentification number, printing out the blank form; and if the input data does not contain a form indentificaton number, storing the input data as a form.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
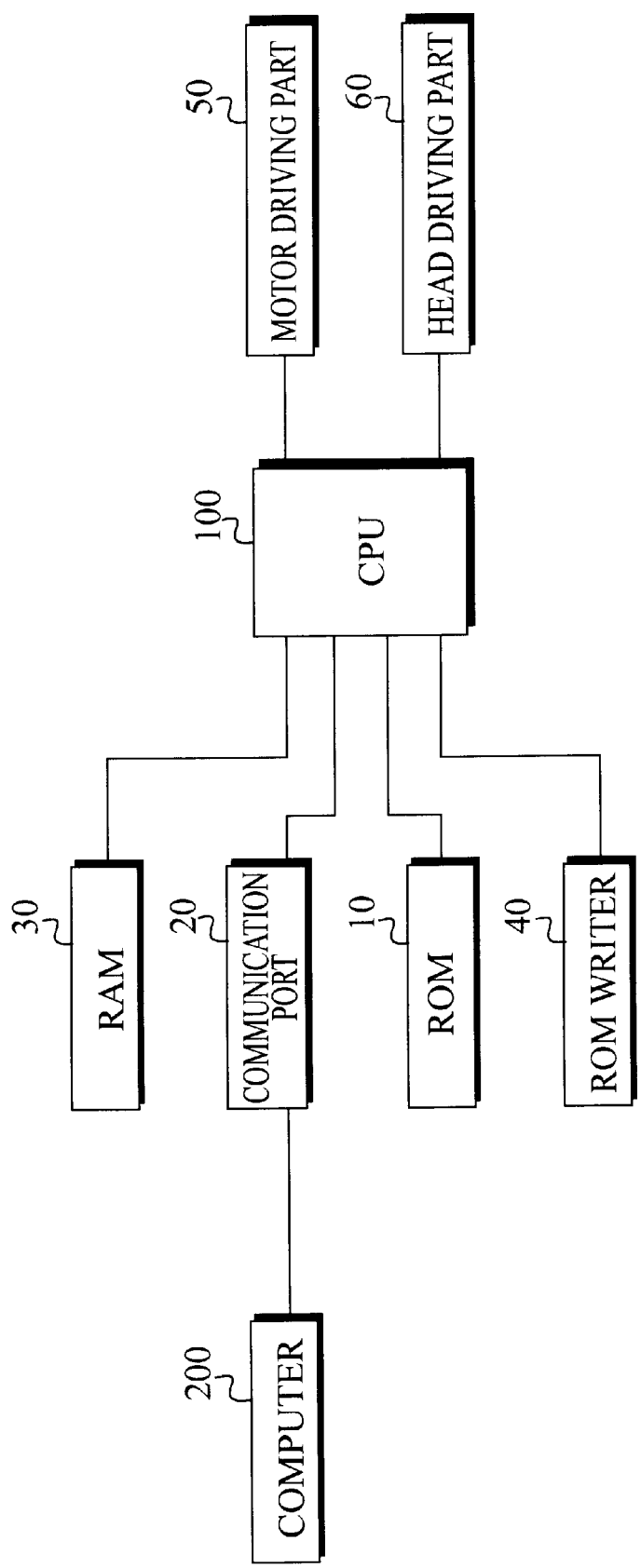
FIG. 1 is a block diagram of an ink-jet printing system in accordance with the present invention.

As shown in FIG. 1, an ink-jet printing system of the present invention includes a central processing unit (CPU) 100 which controls the overall operation of the printing system, a read only memory (ROM) 10 which stores various control programs to be furnished to CPU 100, a communication port 20 which receives data for a form to be printed from a host computer 200, a random access memory (RAM) 30 that temporarily stores the data transmitted from the host computer 200 through the communication port 20, a ROM writer 40 which stores a document form transmitted to the communication port 20 in response to a command from the CPU 100, a motor driving part 50 which controls a paper feeding/paper output/carriage return motor, and a head driving part 60 for controlling a printer head.

Figure 3:
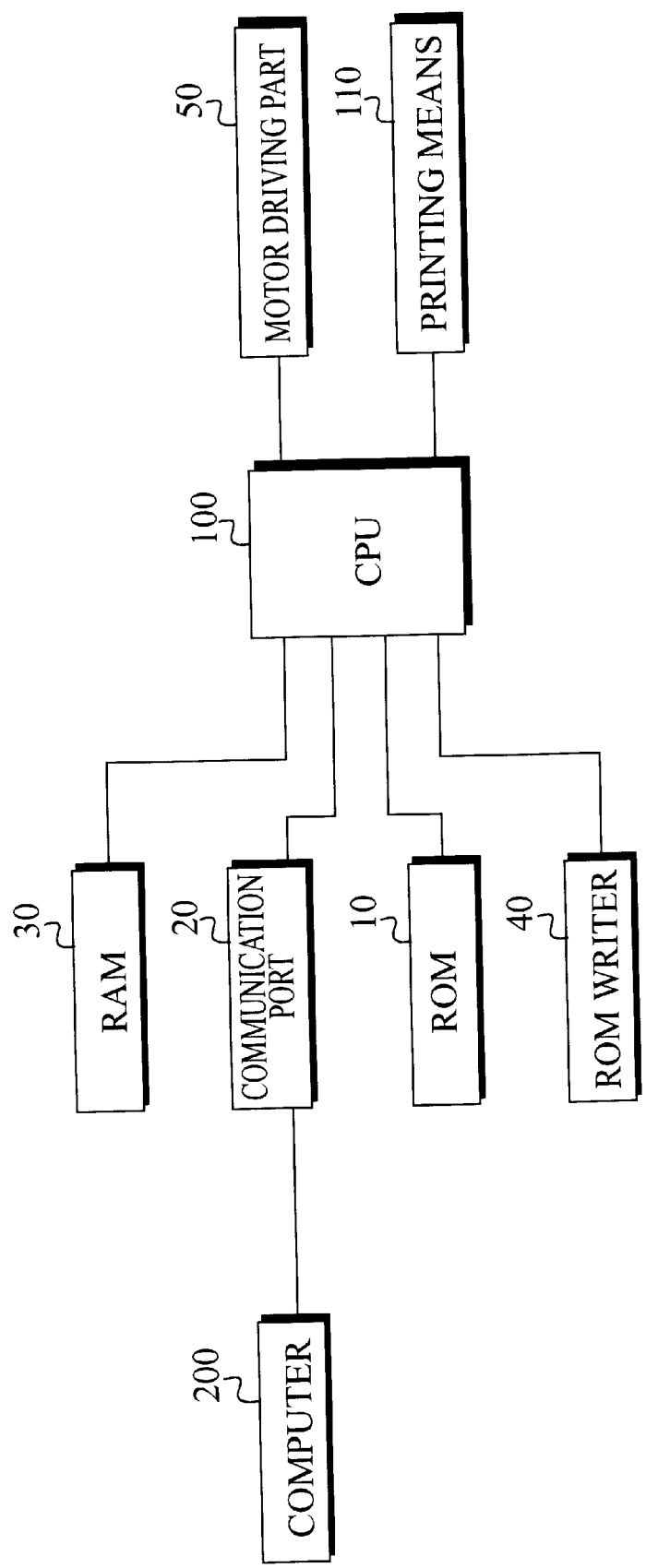
FIG. 3 is a block diagram of an electrophotographic development printer in accordance the present invention.

FIG. 3 depicts an electrophotographic development system according to the present invention. A printing means 110, instead of the head driving means 60, is connected to CPU 100 for printing an image on paper. The present invention can be applied to both kinds of printing systems, including ink jet printers and electrophotographic development printers.

Figure 2:
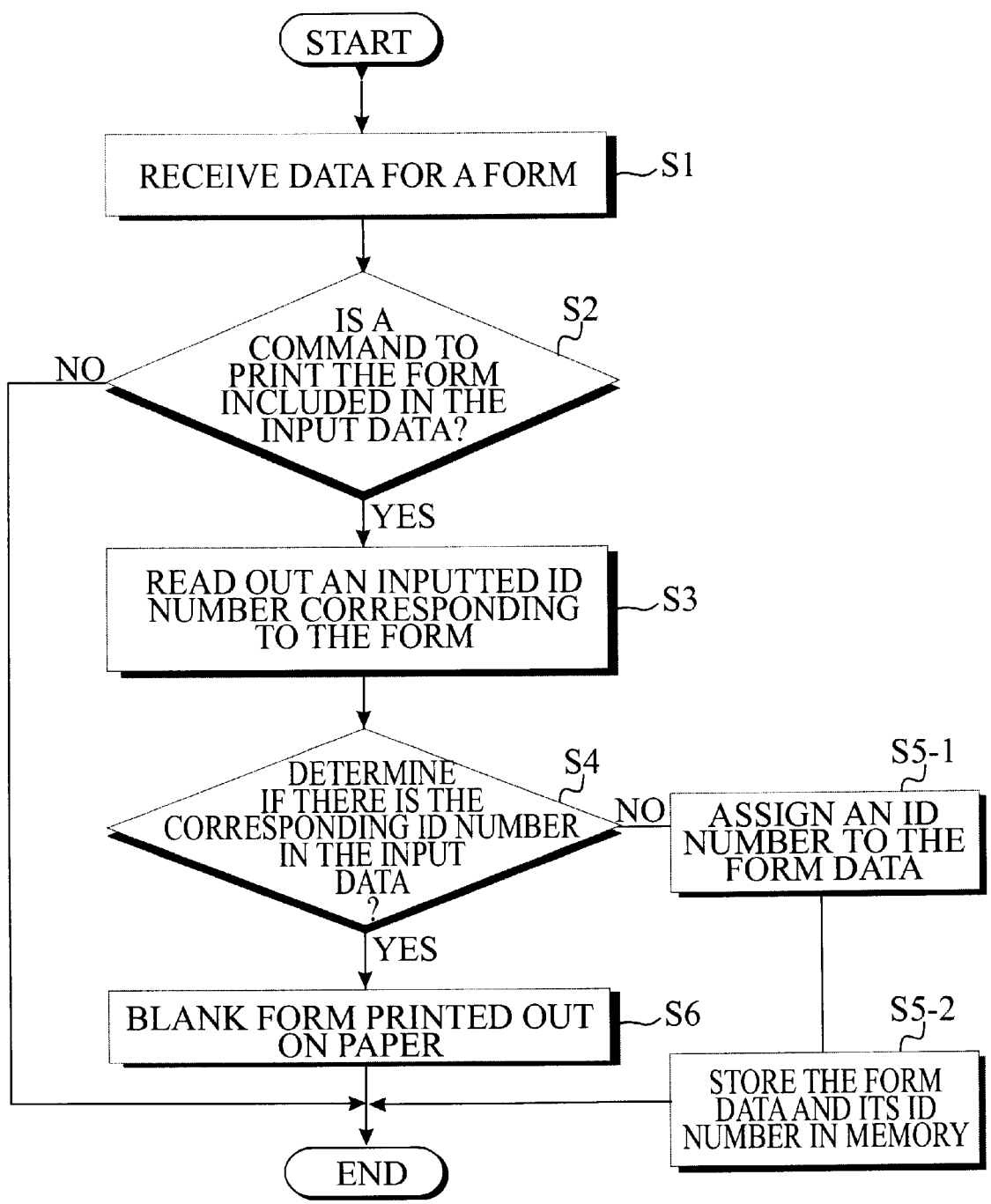
FIG. 2 is a flowchart of the control sequence of the present invention.

The control sequence of the inventive printing system is now described referring to FIG. 2. The CPU 100 receives (S1) data for a form to be printed from the host computer 200 through the communication port 20, and determines (S2) if a command to print the form is included in the input data. If there is the command to print in the input data, CPU 100 reads out (S3) the data to check for an identification number ID corresponding to the form, and determines (S4) if an identification number corresponding to the form is contained in the data stream. If so, CPU 100 allows (S6) the form to be printed out on paper. If there is no corresponding identification number in the input data stream, the CPU 100 stores (S5-1 and S5-2) the data for the form in the printing system.

The steps of storing the form in the printing system is now described in more detail. The CPU 100 assigns (S5-1) an identification number to the form transmitted from host computer 200, and stores (S5-2) the form and its identification number in the ROM 10 of the printing system.

If there is a corresponding ID number stored in the memory, the form is printed out on paper (S6).

As described above, the printing system of the present invention may print out a fixed form on ordinary paper, stored in the printing system, and allows us to use them instead of expensive forms made by printing shops. In addition, we can design various forms working on computers, and store them in the inventive printing system. The inventive printing system receives and stores necessary data for forms in its memory and automatically prints it out in response to the input of a command to print, and there is no trouble of using this system, thus enhancing the productivity.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A printing system, comprising:

a central processing unit for controlling the overall operation of the system;

a read only memory for storing various control programs and initialization data to be provided to the central processing unit;

a communication port for receiving data for a form to be printed from a host computer, the data being transmitted to said central processing unit through said communication port;

a read only memory writer for storing a form in response to a command from said central processing unit;

a random access memory storing the data for the form, output from the host computer through the communication port and through the central processing unit;

a motor driving means driving a paper feeding/paper output motor, and a printing means;

the central processing unit receiving data for a form to be printed from the host computer through said communication port, determining if a command to print the data is included in the input data and determining if an identification number corresponding to said data for said form is present in the input data, and allowing the form to be printed out on paper only if said input data includes said identification number corresponding to said data for said form, assigning an identification number if said input data does not include said identification number corresponding to said data for said form, and storing said data for said form after assigning said identification number if said input data does not include said identification number corresponding to the said data for said form.

2. The printing system of claim 1, wherein the read only memory is a non-volatile memory.

3. The printing system of claim 1, wherein the read only memory is an erasable and programmable read only memory.

4. A method of automatically printing a form, comprising the steps of:

receiving data for a form to be printed from a host computer through a communications port;

determining if the input data includes a command to print the form;

if the input data includes the print command, determining if an identification number for the form is included in said input data;

if said identification number is present in said input data, printing the form;

if no identification number is present in the said input data, assigning an identification number to the data for said form; and, if no identification number is present in the said input data, storing said input data along with said newly assigned identification number for said form in a memory.

* * * * *